UNITED STATES PATENT OFFICE.

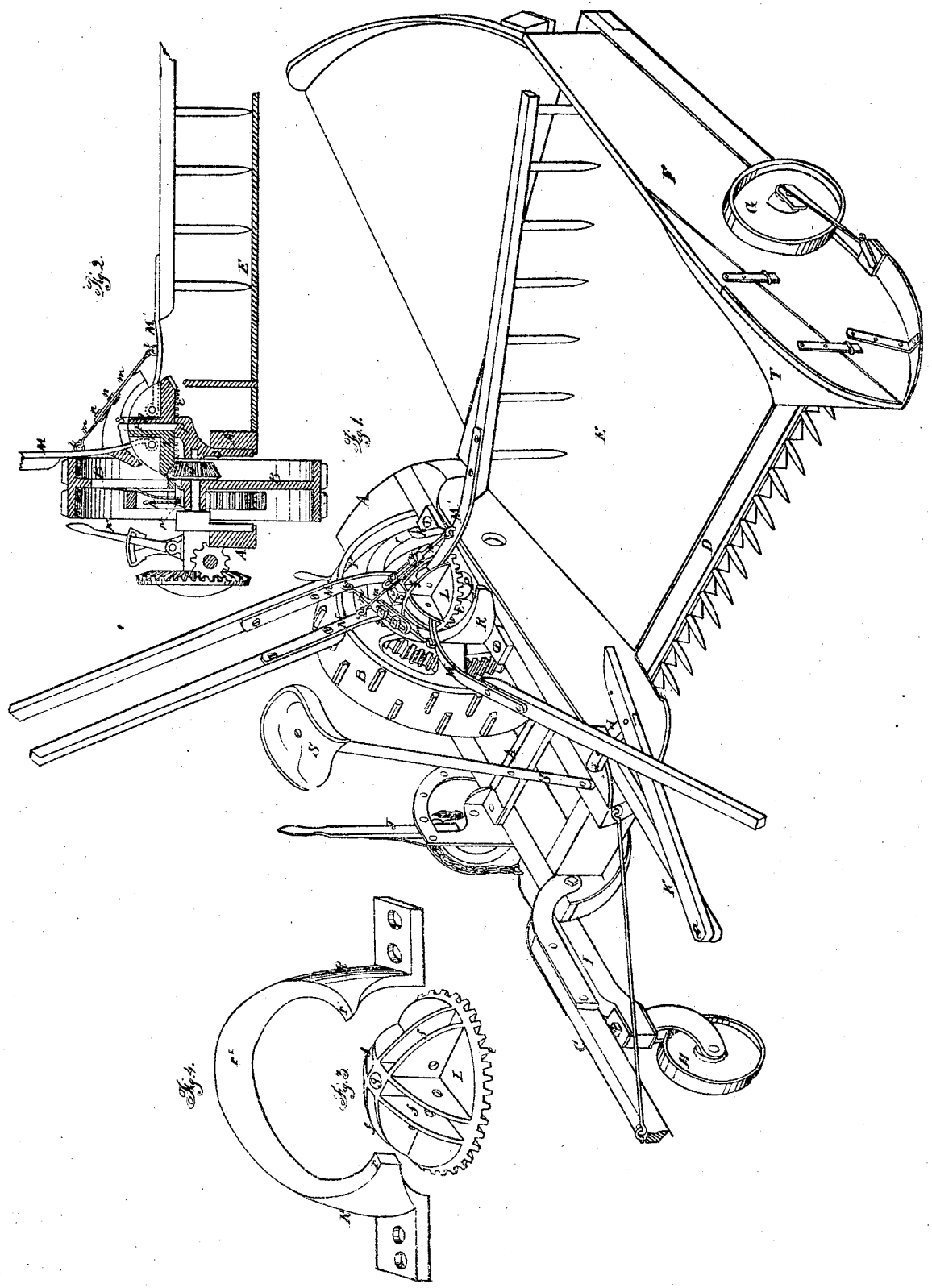
J. S. Marsh.
Harvester Rake.
Nº 37630    Patented Feb. 10, 1863.

JAMES S. MARSH, OF LEWISBURG, PENNSYLVANIA.

IMPROVEMENT IN HARVESTERS.

Specification forming part of Letters Patent No. 37,630, dated February 10, 1863.

*To all whom it may concern:*

Be it known that I, JAMES S. MARSH, of Lewisburg, in the county of Union and State of Pennsylvania, have invented certain new and useful Improvements in Harvesters; and I do hereby declare that the following is a full, clear, and exact description of the same, reference being had the accompanying drawings, forming part of this specification, in which—

Figure 1 is a perspective view, Fig. 2 a transverse secton, and Figs. 3 and 4 details, of my improvements in connection with a harvester.

Similar letters of reference in the several figures indicate corresponding parts.

A is the side-draft frame of a harvester; B, the driving-wheel; C, the tongue; D, the finger-beam; E, the platform; F, the outer guard, and G the small supporting-wheel. The machine is adjusted on the axle of the drive-wheel by means of a caster-wheel, H, and compound-lever arrangement I J.

Thus far described, the machine has previously been in use, and I have referred to the parts here in order to facilitate the description of my invention, and to show that the improvements I have made are adjustable with the finger-beam and platform on a draft-frame which has the drive-wheel as its axis of motion and the cutting apparatus in front of drive-wheel.

My first improvement is a grain-guard, K, made so as to shut and open on a joint or pivot, *a*, and arranged on the front end of the inner beam of the draft-frame A, as shown in Fig. 1 of the drawings. One limb of this guard extends forward on a slightly-oblique line, and is not adjustable. From the extreme forward end of this fixed limb another limb extends back far enough to slightly overhang the finger-beam. Near the rear extremity of this second limb a curved arm, *d*, is attached. This arm is perforated with a series of holes, and it extends over the first limb, as represented. With this arrangement the grain, as the machine is operating, is prevented from falling over upon the draft-frame, and the grain is also caused to fall upon the platform at a point away from the inner guard thereof. The extent of distance that the grain falls away from this guard can be regulated at pleasure by moving the curved arm to the right or left and inserting a pin in one of its holes. This adjustment of the arm causes the second limb of the guard to have a greater or less obliquity to the path of the machine, and as the obliquity is so will be the deposit of the grain upon the platform. If the grain is much bent over toward the draft-frame, the obliquity must be great; but if it is straight, then the obliquity may be slight. This grain-guard at the point shown is as essential as the adjustable dividers or guides used on the off side of the machine.

My second improvement is a combined rake and reel, and an outer or off side device, which, in connection with the rake, insures a clearing of loose tangled grain from the divider.

My rake is constructed upon a crown-wheel, L, which has bevel-teeth *e* on its under side, and four open boxes, *f f f f*, on its top, arranged around a common tubular center, *g*, as represented. The top of the crown-wheel is hollowed out, so as to accommodate the lower or pivoted ends of the rake-heads and reel-bars as the same rise and fall in the path of a vertical circle while moving with the crown-wheel in the path of a horizontal circle. To the crown-wheel I pivot four curved or bent arms, M M M M', so that their inner ends rest loose but snugly in the boxes *f*, as shown. One of these arms is provided with a rake-head with teeth, and the others are furnished with straight reel-bars, as represented. The arms are linked together in pairs, one pair being independent of the other. The linking devices are designated by the letters *m m'*. The part *m* is slotted, and the part *m'* is furnished with one or more screw-holes, and the respective parts are connected by an eye to staples *l l* of the curved arms. Set-screws *n n*, which pass through the slots into the screw-holes of the devices *m m'*, are used to connect the parts of said devices together, and to adjust the arms of rake-head and reel-bars as occasion may demand. Any other mechanical device—such as a link-nut and two hinged screws or the equivalent thereof—may be used in place of the devices *m m'*.

The arms M M M M' are curved, as shown, in order that the rake-head and reel-bars may be made short and still sweep the entire width of the platform. The curve insures the descent of the innermost tooth of the rake-head upon grain lying upon the platform, near the innermost front corner thereof. It also allows the arms M M M M' to assume a perpendicular position and move by the drive-wheel without interruption therefrom.

The rake and reel thus constructed I locate on the inner side beam of the draft-frame and over the inner segment-box, O, of the drive-wheel. To thus locate the rake I prefer to cast the segment-box and the vertical shaft of the crown-wheel in one piece, as shown at O P, Fig. 2, and in order to effect this I make a suitable durable bearing, P, and set it in the mold and cast the segment-box upon it. The set of the vertical shaft P must be at right angles to the platform, and after I have obtained the lowest adjustment of the platform I adopt that as my guide, because the other adjustments of the whole machine will either be produced by a movement on the drive-wheel axle or an adjustment of the segment-boxes, and in either case the rake will conform to the platform, unless the platform warps, in which case the links will serve as a compensating means. The vertical shaft extends through the tubular center of the crown-wheel, and receives a nut, $s$, on its tip end.

It should here be stated that a small pinion bevel-wheel, Q, is arranged on the drive-wheel shaft so as to gear with the crown-wheel, as shown. This is fitted loose, but by means of a pin, $p$, is made fast, as occasion may require. The pin has a turning movement in one of the arms of the drive-wheel, and is furnished with a lever-arm, $p'$, so that such movement may easily be imparted to it. The pin also has a sliding movement while it is turning. To produce this latter movement a cam, $p^2$, is arranged on the drive-wheel in the respect to the lever-arm, as shown. The cam is a fixture with the drive-wheel, and it, by reason of its inclined or cam edge $p^3$, draws the pin out of the hole $p^3$ of the pinion bevel-wheel when the lever-arm is moved in contact with said inclined edge. A flat spring, $p^4$, forces the pin back into the hole $p^3$ when the lever-arm is moved in a reverse direction. The pin and loose pinion enable me to throw the rake in and out of operation at will.

The rake-head and reel-bars are so linked together that each linked pair forms a right angle, or so that when the rake-head or reel-bar of one pair is horizontal the fellow thereto is vertical, or nearly so. Now, in order to guide and stay the rake-head and reel-bars in their movements, I arrange a segment of an elliptic cam, R, around and partially over the crown-wheel L and the pivoted ends of the rake-head and reel-bar arms, as represented. The top edge of this cam is beveled, as indicated at $r\ r'$, and these beveled portions terminate in a vertical plane, $r^2$. The beveled portions are concave on a vertical circle, while the vertical plane portion is concave on a horizontal circle. The highest portion of the cam is that where the vertical plane is located. From this point the cam lowers in height, both back and front. The front termination is somewhat lower than the back termination. This cam is bolted firmly to the inner side timber of the draft-frame, as represented in Fig. 1. A clear representation of the cam is shown in Fig. 4.

I have spoken of the pin or shaft P as being vertical; but I do not wish to be understood as limiting myself strictly to a shaft or center which is only at right angles to a horizontal plane, as the shaft might be set with a slight obliquity. I only refer to it as vertical in contradistinction to horizontal.

From an inspection of the drawings, Fig. 1, the result of my invention will be seen. That result is the impartation of a motion around a vertical shaft to the rake and reel, and at the same time a motion in each of the arms of the rake-head and reel-bars in the path of a vertical circle. The means for accomplishing this result are such that both the reel-bars and the rake-head extend entirely across the platform in sweeping the same, and in leaving the platform they begin gradually to assume a perpendicular position with respect to the platform, and are maintained or supported in this operation by the cam R, and by being thus supported they serve in turn to brace their linked fellows and hold them firmly in position with respect to the platform and the grain, both in the field and on said platform. Thus I have secured a compact, simple, and firm automatic rake and reel, operating on the most approved principle, and while this is the case I have obviated many objections to that class of rakes which employ arms that overhang the draft-frame and drive-wheels of the harvester. One of the objections to most of the rakes of this class is that of cumbersomeness and extensiveness of sweep beyond the right side of the draft-frame. Another objection is the impossibility of adjusting them on the drive-wheel axle by the ordinary adjusting-lever while the machine is in motion and from a seat on the draft-frame—that is, when the rake is arranged on the one draft-frame, instead of on an auxiliary frame, and even when arranged on a second or auxiliary frame the adjustment cannot be made from a seat on the machine, unless my invention, or the equivalent thereof, be adopted. I think I have effected an important end in being able to adjust this character of continuously rotating rake by the same devices that adjust the cutting apparatus. This end I have attained by having the rake a fixture with the draft-frame and locating it in relation to the drive-wheel, as shown.

The driver's seat S with my arrangement can be supported on the draft-frame, as indicated at S'; or it may be otherwise located on the same. I, however, prefer the arrangement of it in the manner represented, as such arrangement gives the manager a spring-seat and locates him out of the way of danger, and in such a position that if an accident happens he can step upon the ground in a moment.

The device T on the inner side of the outer guard, F, is a horizontal board in form of a half-spear in longitudinal section. It is located high enough on the guard F to just admit the outer ends of the rake-head and reel-bars above it. By this device the ends of the rake and reel bars are guided or supported, and the tangled grain which hangs on the guard F is cleared away therefrom by the rake and reels. The falling grain is also directed upon the platform in a more proper manner for the action of the outermost rake-teeth upon it.

In the drawings I have shown three reel-bars and one rake-head with teeth in it. The number of bars might be changed; so, also, might two or more rake-heads be used. This, however, depends upon the character of the grain and the speed of the machine. The blank bars bend in the grain to the cutting apparatus, and the rake-toothed bar sweeps the cut grain from the platform.

My improvements are applicable to machines with more than one driving-wheel.

I am aware that a single rake-head with rake-teeth in it has been arranged to revolve entirely around a vertical center. I also am aware that rake-arms and reel-bars have been placed around a central hub and revolved around a center. I also am aware that such arms and reel-bars have been hinged separately to such hub. I also am aware that an elevation and depression of such arms and bars have been effected by a cam; but I am not aware that a rake operating, constructed, and applied as I show has ever been devised, and, therefore, while I do not claim a single rake-arm revolving around a center, nor, broadly, a series of arms arranged upon a central revolving hub, nor a series of such arms hinged separately to the hub, nor all cams for producing the motion of such arms, nor, broadly, the adjustment of the raking apparatus on the axle of the drive-wheel, I do claim as my invention and desire to secure by Letters Patent—

1. The linking devices described, or their equivalents, applied to the arms of the raking apparatus, substantially as described.

2. The adaptation of a raking and reeling apparatus combined, which revolves entirely around a vertical center for application to the inner side of the draft-frame of a harvester at a point below the top of the drive-wheel, substantially as and for the purpose set forth.

3. The use of the inner bearing of the drive-wheel as the support of the center on which the combined rake and reel revolves, substantially as described.

4. The construction of the shaft or center P of the rake and reel and the inner segment of the drive-wheel in one piece, in the manner described.

5. The combination of the cam R, hinged rake and reel bars, and adjustable links, so as to keep the rake and reel bars firmly in contact with the grain in the field and on the platform, substantially as set forth.

6. The arrangement of the sliding and turning spring-pin $p$, incline $p^2$, loose bevel-pinion Q, and the raking and reeling apparatus, substantially as described.

7. The adjustable grain-guard K, constructed substantially as described, and applied to the inner front corner of the draft-frame, for the purpose set forth.

JAMES S. MARSH.

Witnesses:
CHAS. C. SHORKLEY,
PETER BEAVER.